United States Patent
Ihlemann et al.

(10) Patent No.: US 8,051,824 B2
(45) Date of Patent: Nov. 8, 2011

(54) SHAFT

(75) Inventors: Arndt Ihlemann, Höchstadt (DE); Peter Solfrank, Frensdorf (DE); Lisa Dombos, Schwaig (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 459 days.

(21) Appl. No.: 12/374,062

(22) PCT Filed: Jul. 3, 2007

(86) PCT No.: PCT/EP2007/056682
§ 371 (c)(1),
(2), (4) Date: Apr. 10, 2009

(87) PCT Pub. No.: WO2008/009551
PCT Pub. Date: Jan. 24, 2008

(65) Prior Publication Data
US 2009/0308344 A1    Dec. 17, 2009

(30) Foreign Application Priority Data
Jul. 19, 2006  (DE) .......................... 10 2006 033 416

(51) Int. Cl.
*F02B 75/06* (2006.01)

(52) U.S. Cl. ............ 123/192.2; 123/192.1; 123/198 DA; 384/468; 184/6.26; 74/603; 74/604; 74/605; 464/127; 464/180

(58) Field of Classification Search ............... 123/192.2, 123/192.1, 198 DA; 74/603, 604, 605; 384/468, 384/213, 322, 462, 465, 466; 184/6.26; 464/127, 464/180
See application file for complete search history.

(56) References Cited

U.S. PATENT DOCUMENTS

| 6,305,339 | B1   | 10/2001 | Iwata et al. | |
| 6,659,060 | B2 * | 12/2003 | Linder et al. | 123/192.2 |
| 6,772,725 | B2 * | 8/2004  | Inaba et al. | 123/192.2 |
| 6,880,512 | B2 * | 4/2005  | Hashimoto et al. | 123/192.2 |
| 7,444,976 | B2 * | 11/2008 | Hofheinz et al. | 123/192.2 |

FOREIGN PATENT DOCUMENTS

| DE | 1751837 | 8/1971 |
| EP | 0243683 | 11/1987 |
| EP | 1081410 | 3/2001 |
| EP | 1304450 | 4/2003 |
| EP | 1564436 | 8/2005 |

* cited by examiner

*Primary Examiner* — Michael Cuff
*Assistant Examiner* — Hung Q Nguyen
(74) *Attorney, Agent, or Firm* — Volpe and Koenig, P.C.

(57) ABSTRACT

A shaft (1*a-d*) is provided that is rotatably mounted by a journal (2) in a housing (4) in which lubricant mist is provided. One or several outward-extending ribs (6) extend between the journal and shaft sections (5*a*, 5*b*) adjacent to the journal. The shaft is mounted by the journal in the housing using a rolling bearing (3) that is lubricated exclusively by the lubricant mist. At least one of the ribs associated with the journal extends at a certain angle of attack (11, 12) to the axis of rotation of the shaft and is used as a blade for conveying the lubricant mist into the rolling bearing.

8 Claims, 2 Drawing Sheets

SHAFT

BACKGROUND

The invention relates to a shaft, in particular, a compensating shaft of a device for compensating forces of gravity and/or moments of inertia of a reciprocating piston internal combustion engine. The shaft is mounted so that it can rotate on one or more journals in a housing filled with a lubricating oil mist, wherein at least one of the journals projects radially past one or two shaft sections adjacent to these journals at least within one part of the periphery and wherein one or more radially outward extending ribs extend within the part of the periphery between the one or more journals and the one or two adjacent shaft sections.

Such a shaft is known from U.S. Pat. No. 6,305,339 B1 in which the shaft is formed as a compensating shaft of a mass-compensating drive known to someone skilled in the art in the field of reciprocating piston internal combustion engines. The compensating shaft proposed there has unbalanced masses arranged on both sides of a journal, while the journal projects significantly in the radial direction past the shaft sections adjacent to this journal within a part of the periphery that is diametrically opposite the unbalanced masses. For bracing the compensating shaft there are ribs that extend within the part of the periphery between the journal and the adjacent shaft sections.

As support means there is a sliding bearing shell arranged between the housing of the mass compensating gear and the journal as a hydrodynamic sliding bearing. A prerequisite for the construction of a sufficiently good load-bearing lubricating film in such a sliding bearing, however, is a defined supply of lubricating oil to the bearing point that leads, especially in the case of a typically cost-sensitive reciprocating piston internal combustion engine to undesired additional costs based on the boreholes and/or channels required for this purpose. Another disadvantageous property of the hydrodynamic sliding bearing results from the relationship between the viscosity of the lubricating oil and the friction power losses that can generally contribute especially at low temperatures and high viscosity lubricating oil to a considerable portion of the power losses of the reciprocating piston internal combustion engine or a machine driving the shaft.

SUMMARY

The present invention therefore is based on the objective of developing a shaft of the type noted above such that the indicated disadvantages are avoided. Consequently, the journal or journals of the shaft should be supported so that they can rotate in the housing by bearing points with the simplest possible construction including an attachment construction that can be produced with low expense for sufficient supply of lubricating oil to the bearing points. In addition, the bearing of the shaft should be realized with as little friction as possible and essentially free from the effects of the viscosity of the lubricating oil on the friction power that decreases when the shaft is driven.

This objective is met according to the invention in that the shaft is supported in the housing on the one or more journals by a roller bearing lubricated by the lubricating oil mist, wherein at least one of the ribs associated with at least one of the journals extends at an angle of attack inclined to the rotational axis of the shaft and acts as a blade for feeding the lubricating oil mist into the roller bearing.

The lubricating oil mist already present in the housing is used to supply roller bearings known for low and essentially temperature-independent friction power losses as well as for favorable productions costs with sufficient lubricating oil, in that, as a function of the angle of attack of the individual rib, either a deflection or a pressure flow of the lubricating oil mist directed from this rib to the roller bearing or else a suction flow of the lubricating oil mist directed through the roller bearing to the rib is set when the shaft rotates. In the case of a compensating shaft with bracing ribs, like those proposed in the publication cited above, these merely need to be rotated by the angle of attack and thus can be arranged at neutral cost on the compensating shaft.

As is known to someone skilled in the art of flow devices, the ribs constructed as blades should obviously not only be limited to flat ribs with a constant angle of attack, but instead can also have a profile adapted with respect to the flow or deflection to be achieved including an angle of attack that is variable across the axial extent thereof.

In one improvement of the invention, the roller bearing should be constructed as a needle bearing with a thin-walled outer ring produced without cutting, a cage, and needles guided in this cage. Such a needle bearing also designated as a needle sleeve provides an especially cost effective and radially compact roller bearing for the shaft, wherein the journals are used as inner raceways for the needles.

In addition, it can be provided that the ribs that extend between the one or more journals and the shaft section adjacent to these journals have, in the peripheral direction of the shaft, an angle of attack oriented with equal action with respect to the conveying direction of the lubricating oil mist. In the case of a shaft whose operating rotational direction is fixed and is here designated as the normal rotational direction, the lubricating oil mist should be fed from the direction of the shaft section adjacent to the journals toward the roller bearing for this normal rotating direction, so that the pressure flow or deflection of the lubricating oil mist explained above is set from the direction of the respective rib into the roller bearing.

A two-sided supply of lubricating oil to the roller bearing from the direction of two adjacent shaft sections can also be realized such that the ribs that extend between the one or more journals and the other shaft section adjacent to these ribs also have an angle of attack oriented with equal action with respect to the conveying direction of the lubricating oil mist in the peripheral direction of the shaft, such that, for a given normal rotational direction of the shaft, the lubricating oil mist is fed both from the direction of one shaft section and also from the direction of the other shaft section toward the roller bearing.

Consequently, a supply of lubricating oil to the roller bearing that is essentially independent of the rotational direction of the shaft can be guaranteed such that the ribs that extend between the one or more journals and the other shaft section adjacent to these journals also have, in the peripheral direction of the shaft, an angle of attack oriented with equal action with respect to the conveying direction of the lubricating oil mist such that in a first rotational direction of the shaft, the lubricating oil mist is fed in the direction of one shaft section away from the roller bearing and from the direction of the other shaft section towards the roller bearing and that in the opposite, second rotational direction of the shaft, the lubricating oil mist is fed from the direction of one shaft section towards the roller bearing and in the direction of the other shaft section away from the roller bearing.

Thus, the lubricating oil flow led through the roller bearing can be increased independent of the rotational direction of the shaft by superimposing the pressure or suction conveyance of the lubricating oil mist generated on both sides of the journal.

Another supply of lubricating oil to the roller bearing that is independent of the rotational direction of the shaft can also be generated such that the ribs that extend between the one or more journals and the one or two shaft sections adjacent to these journals have, in the peripheral direction of the shaft, angles of attack not oriented with equal action with the conveying direction of the lubricating oil mist alternating toward the roller bearing and away from the roller bearing.

Finally, the reciprocating piston internal combustion engine is preferably a four-cylinder inline engine with two compensating shafts rotating in opposite directions, wherein the compensating shafts are arranged parallel to the longitudinal axis of the crankshaft of the reciprocating piston internal combustion engine and are driven at least indirectly by the crankshaft with twice the crankshaft rotational speed. This arrangement also known as Lancaster compensation to someone skilled in the art is used for compensating the free forces of gravity of second order in four-cylinder inline engines that are produced worldwide in considerable quantities and under considerable cost pressure. In this way, the construction of the compensating shaft according to the invention contributes to a considerable reduction of the production costs due at least to the low-expense supply of lubricating oil to the shaft support. Under consideration of fuel consumption regulations for reciprocating piston internal combustion engines that are becoming stricter worldwide, a lubricating oil flow that must be conveyed from the lubricating oil pump of the internal combustion engine and that increases the fuel consumption for the shaft support can be eliminated.

BRIEF DESCRIPTION OF THE DRAWINGS

Additional features of the invention emerge from the following description and from the drawings in which are shown in a simplified way a shaft according to the invention with different constructions of the ribs constructed as blades and also a compensating shaft of a device for mass compensation of a reciprocating piston internal combustion engine as an exemplary application of the shaft according to the invention. Shown are.

DETAILED DESCRIPTION OF THE PREFERRED EMBODIMENTS

Figure 1:
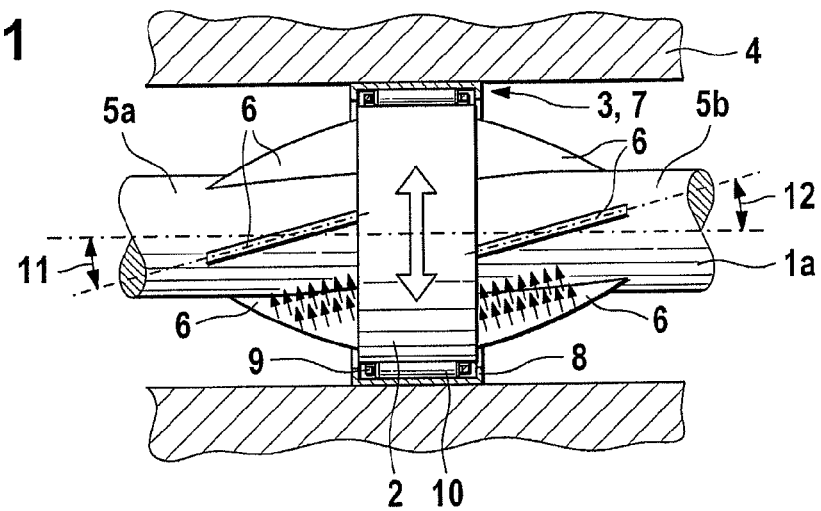
FIG. 1 a section view of a shaft with ribs oriented independent of the rotational direction, FIG. 2 a section view of a shaft with ribs oriented dependent on the rotational direction, FIG. 3 a section view of a shaft with combined orientation of the ribs independent of the rotational direction, FIG. 4 a schematic diagram of a device for mass compensation of a reciprocating piston internal combustion engine, and FIG. 5 a simplified longitudinal diagram of one of the compensating shafts from FIG. 4.
Figure 2:
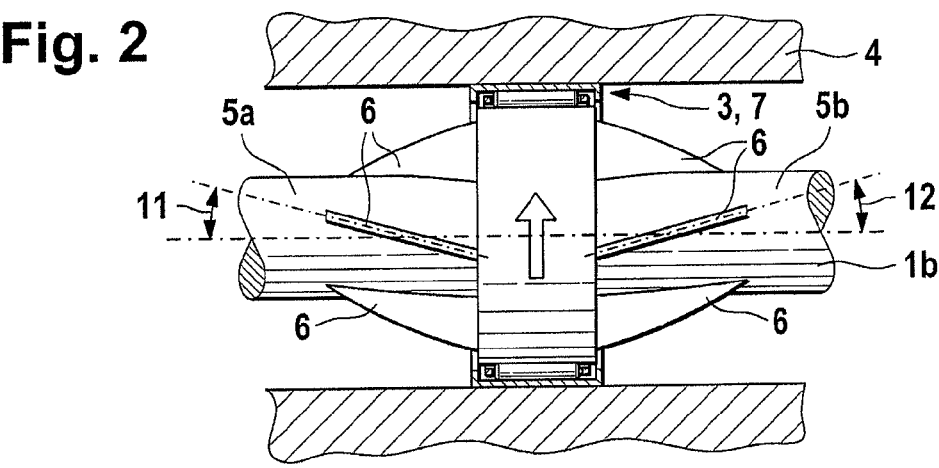
Figure 3:
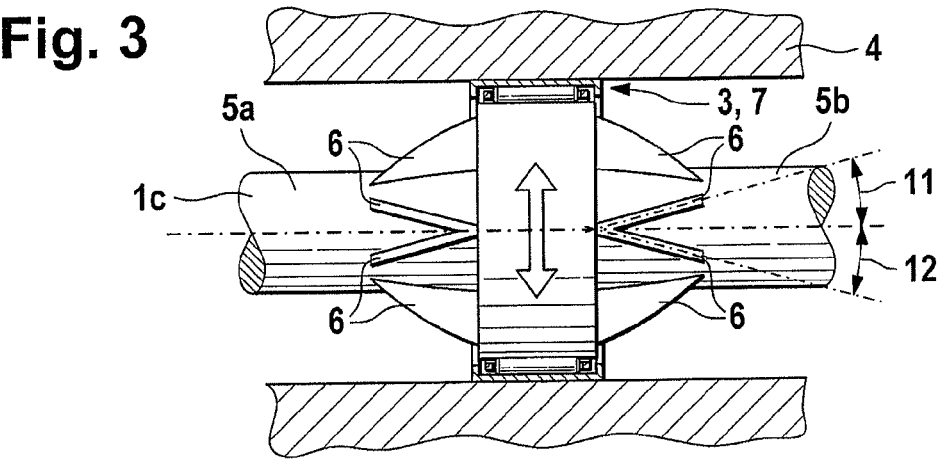

In each of FIGS. 1 to 3, a section of the shafts 1a, 1b, and 1c according to the invention that is essential for the understanding of the invention is shown, wherein these shafts are supported so that they can rotate on a journal 2 by a roller bearing 3 in a housing 4 filled with lubricating oil mist. The shafts 1a, 1b, 1c have in common that, on their full extent, journals 2 project radially past shaft sections 5a and 5b adjacent to the journals 2 on both sides and that between the journal 2 and the adjacent shaft sections 5a and 5b, several ribs 6 extend that are distributed uniformly across their extent and extending radially outwardly. Another common feature consists in the roller bearing 3 that is constructed as a needle bearing 7 that is here arranged as a radial installation space-saving needle sleeve consisting of a thin-walled outer ring 8 produced without cutting, a cage 9, and needles 10 guided therein between the housing 4 and the journal 2 and is supplied merely with the lubricating oil mist present in the housing 4. For this purpose, the ribs 6 constructed here in one piece with the shafts 1a, 1b, 1c have not only a bracing function, but are also used as blades for generating a flow or deflection of the lubricating oil mist, in that the ribs 6 each extend at an angle of attack 11 or 12 inclined to the rotational axes of the shafts 1a, 1b, 1c and convey the lubricating oil mist into the needle bearing 7 and/or through the needle bearing 7 as a function of the orientation of the angle of attack 11, 12 with respect to the rotational direction of the shafts 1a, 1b, 1c.

For the shafts 1a, 1b shown in FIGS. 1 and 2, both the ribs 6 that extend between the journal 2 and the one shaft section 5a and also the ribs 6 that extend between the journal 2 and the other shaft section 5b have angles of attack 11 and 12 oriented with equal action with respect to the conveying direction of the lubricating oil mist in the peripheral direction of the shafts 1a, 1b.

For the shaft 1a, the supply of lubricating oil to the needle bearing 7 is independent of rotational direction. For the first rotational direction of the shaft 1a according to the arrow pointing upward in FIG. 1 on the journal, the ribs 6 extending on one shaft section 5a generate a suction flow and the ribs 6 extending on the other shaft section 5b generate a pressure flow, each relative to the needle bearing 7. Consequently, the lubricating oil mist is fed from right to left through the needle bearing 7 according to the flow field symbolized by the group of arrows. Conversely, for the second, opposite rotational direction of the shaft 1a according to the arrow pointing downward on the journal, a pressure flow is generated by the ribs 6 extending on one shaft section 5a and a suction flow is generated by the ribs 6 extending on the other shaft section 5b. In this case, the lubricating oil mist is fed from left to right through the needle bearing 7.

The shaft 1b shown in FIG. 2 has a fixed normal rotational direction that corresponds to the arrow drawn on the journal. Here, the angle of attacks 11, 12 of the ribs 6 extending on both sides of the journal 2 are oriented with respect to the conveying direction of the lubricating oil mist such that the lubricating oil mist is fed both from the direction of one shaft section 5a and also from the direction of the other shaft section 5b either under formation of a pressure flow or through deflection to the needle bearing 7.

The shaft 1c shown in FIG. 3 is another variant with angles of attack 11 and 12 of the ribs 6 oriented independent of rotational direction. In this case, the ribs 6 extending between the journal 2 and the two adjacent shaft sections 5a, 5b have angles of attack 11, 12 not oriented with equal action in the peripheral direction of the shaft with conveying direction of the lubricating oil mist alternating toward the needle bearing 7 and away from the needle bearing 7. Preferably, the respective profile and the course of the angles of attack 11, 12 over the axial extent of the ribs 6 shown simplified are to be adapted so that independent of the rotational direction of the shaft 1c, either according to FIG. 1 a pressure-suction conveyance of the lubricating oil mist through the needle bearing 7 generated by both shaft sections 5a, 5b or according to FIG. 2 a pressure conveyance generated by both shaft sections 5a, 5b or deflection of the lubricating oil mist into the needle bearing 7 is generated.

Figure 4:
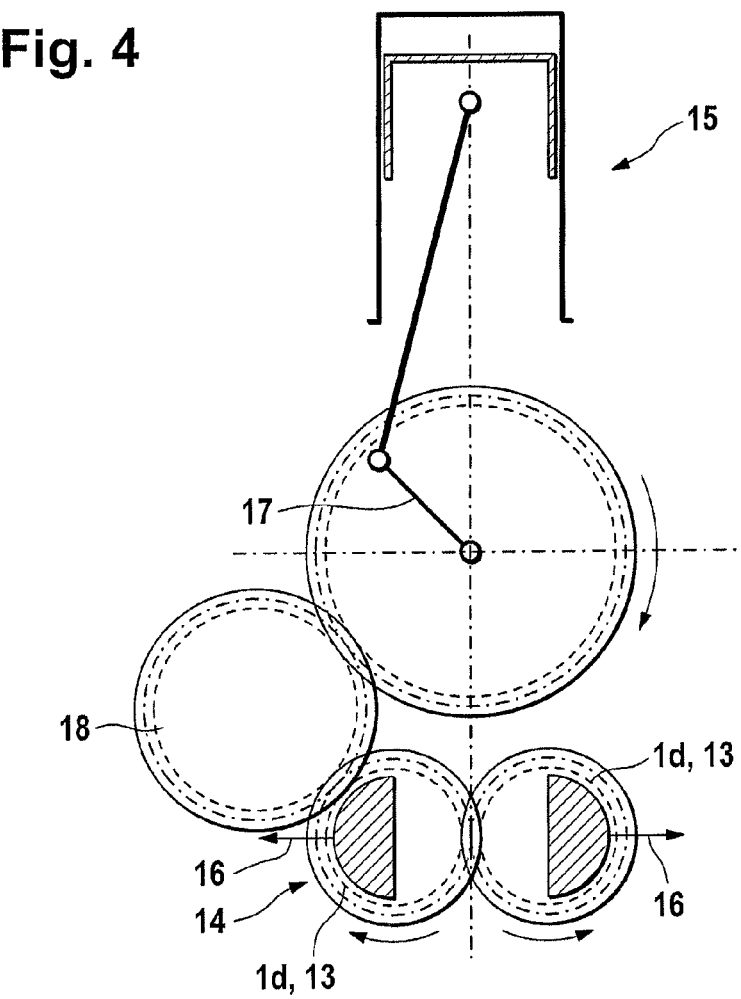
Figure 5:
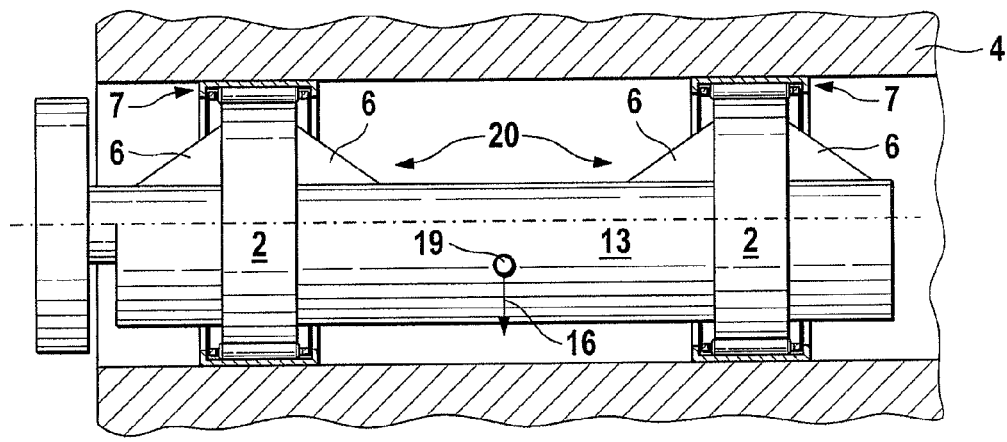

A preferred application of the invention is disclosed in FIGS. 4 and 5. A shaft 1d according to the invention is here constructed as a compensating shaft 13 of a device 14 for compensating forces of gravity and/or moments of inertia of a reciprocating piston internal combustion engine 15. In the present case, this involves a four-cylinder inline engine, wherein the device 14 also designated as a mass-compensating drive is used for compensating forces of gravity of second order (Lancaster compensation). According to the drive schematic shown in FIG. 4, the device 14 comprises two compensating shafts 13 that rotate in opposite directions and that have defined unbalanced masses 16 and that are arranged parallel to the longitudinal axis of the crankshaft 17 of the reciprocating piston internal combustion engine 15 and are driven by an intermediate gear 18 of the crankshaft 17 with twice the crankshaft rotational speed.

The support of one of these compensating shafts 13 emerges in detail from its longitudinal diagram according to FIG. 5. The compensating shaft 13 supported here on two journals 2 using needle bearings 7 in a housing 4 of the reciprocating piston internal combustion engine 15 has a center of gravity 19 located below its center line in FIG. 5 for generating the unbalanced mass 16, while one or more of the ribs 6 explained with reference to FIGS. 1 to 3 extend on a diametrically opposite part of the periphery 20 of the compensating shaft 13 on both sides of each journal 2. Under consideration of the fixed normal rotational direction of the compensating shaft 13 in the device 14, the profiles and the angles of attack over the axial extent of the ribs 6 here also shown simplified are selected, as already explained, so that the needle bearings 7 are optimally supplied with lubricating oil mist that is produced in the housing 4 during the operation of the reciprocating piston internal combustion engine 15.

LIST OF REFERENCE SYMBOLS 1a-d Shaft
2 Journal
3 Roller bearing
4 Housing
5a, b Shaft section
6 Rib
7 Needle bearing
8 Outer ring
9 Cage
10 Needle
11 Angle of attack
12 Angle of attack
13 Compensating shaft
14 Device for mass compensation
15 Reciprocating piston internal combustion engine
16 Unbalanced mass
17 Crankshaft
18 Intermediate gear
19 Center of gravity
20 Part of the periphery

The invention claimed is:

1. A compensating shaft assembly of a device for compensating forces of gravity or moments of inertia of a reciprocating piston internal combustion engine, comprising a compensating shaft supported by one or more journals in a housing filled with a lubricating oil mist, at least one of the journals projects radially past one or two shaft sections of the shaft adjacent to the journals at least within a part of a periphery and one or more radially outward extending ribs extend within the part of the periphery between the one or more journals and the one or two adjacent shaft sections, the shaft is supported on the one or more journals by a roller bearing lubricated merely by the lubricating oil mist in the housing, at least one of the ribs of the one or more journals extends at an angle of attack inclined to a rotational axis of the shaft and is used as a blade for feeding the lubricating oil mist into the roller bearing.

2. The shaft assembly according to claim 1, wherein the roller bearing is constructed as a needle bearing with a thin-walled outer ring produced without cutting, a cage, and needles guided therein.

3. The shaft assembly according to claim 1, wherein the ribs that extend between the one or more journals and the shaft section adjacent to the journals have an angle of attack oriented with equal action with respect to a conveying direction of the lubricating oil mist in a peripheral direction of the shaft.

4. The shaft assembly according to claim 3, wherein for a fixed normal rotational direction of the shaft, the lubricating oil mist is fed toward the roller bearing from a direction of the shaft section adjacent to the one or more journals.

5. The shaft assembly according to claim 4, wherein the ribs that extend between the one or more journals and the other shaft section adjacent to the journals also have an angle of attack oriented with equal action with respect to the conveying direction of the lubricating oil mist in the peripheral direction of the shaft such that, for a given normal rotational direction of the shaft, the lubricating oil mist is fed both from the direction of the one shaft section and also from the direction of the other shaft section toward the roller bearing.

6. The shaft assembly according to claim 3, wherein the ribs that extend between the one or more journals and the other shaft section adjacent to the journals also have an angle of attack oriented with equal action with respect to the conveying direction of the lubricating oil mist in the peripheral direction of the shaft such that for a first rotational direction of the shaft, the lubricating oil mist is fed in the direction of the one shaft section away from the roller bearing and from the direction of the other shaft section toward the roller bearing and that for the opposite, second rotational direction of the shaft, the lubricating oil mist is fed from a direction of the one shaft section toward the roller bearing and in the direction of the other shaft section away from the roller bearing.

7. The shaft assembly according to claim 1, wherein the ribs that extend between the one or more journals and the one or two shaft sections adjacent to the journals have angles of attack that are not oriented with equal action in the peripheral direction of the shaft with a conveying direction of the lubricating oil mist alternating toward the roller bearing and away from the roller bearing.

8. The shaft assembly according to claim 1, wherein the reciprocating piston internal combustion engine is a four-cylinder inline engine with two of the compensating shafts rotating in opposite directions, wherein the compensating shafts are arranged parallel to a longitudinal axis of the crankshaft of the reciprocating piston internal combustion engine and are driven at least indirectly by the crankshaft with twice a crankshaft rotational speed.

* * * * *